Figure 1:
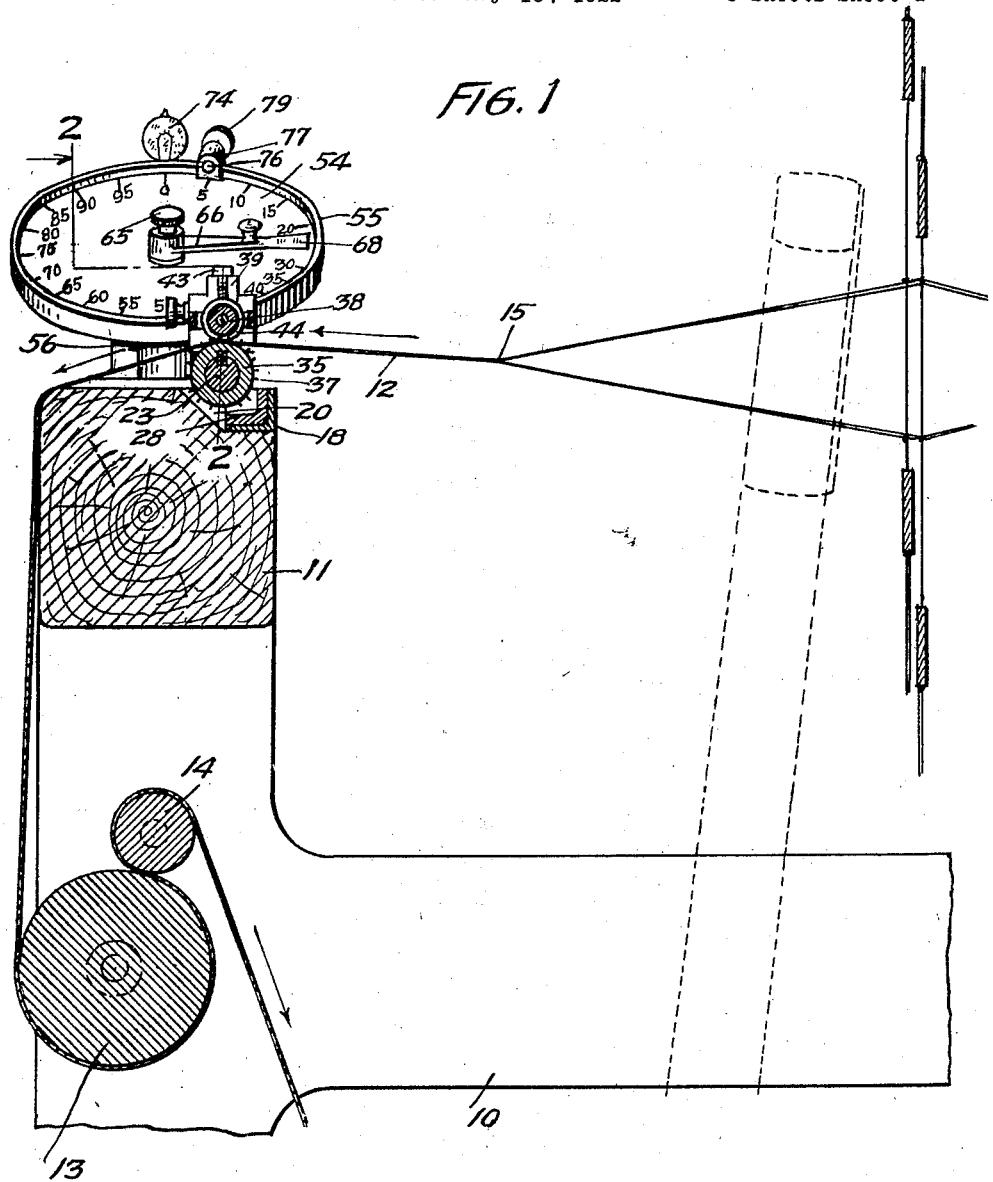

Nov. 27, 1923.

W. G. NORTHUP, JR 1,475,649

CLOTH MEASURING AND REGISTERING DEVICE

Filed May 15, 1922    3 Sheets-Sheet 1

INVENTOR
WILLIAM G. NORTHUP, JR.
BY
HIS ATTORNEYS.

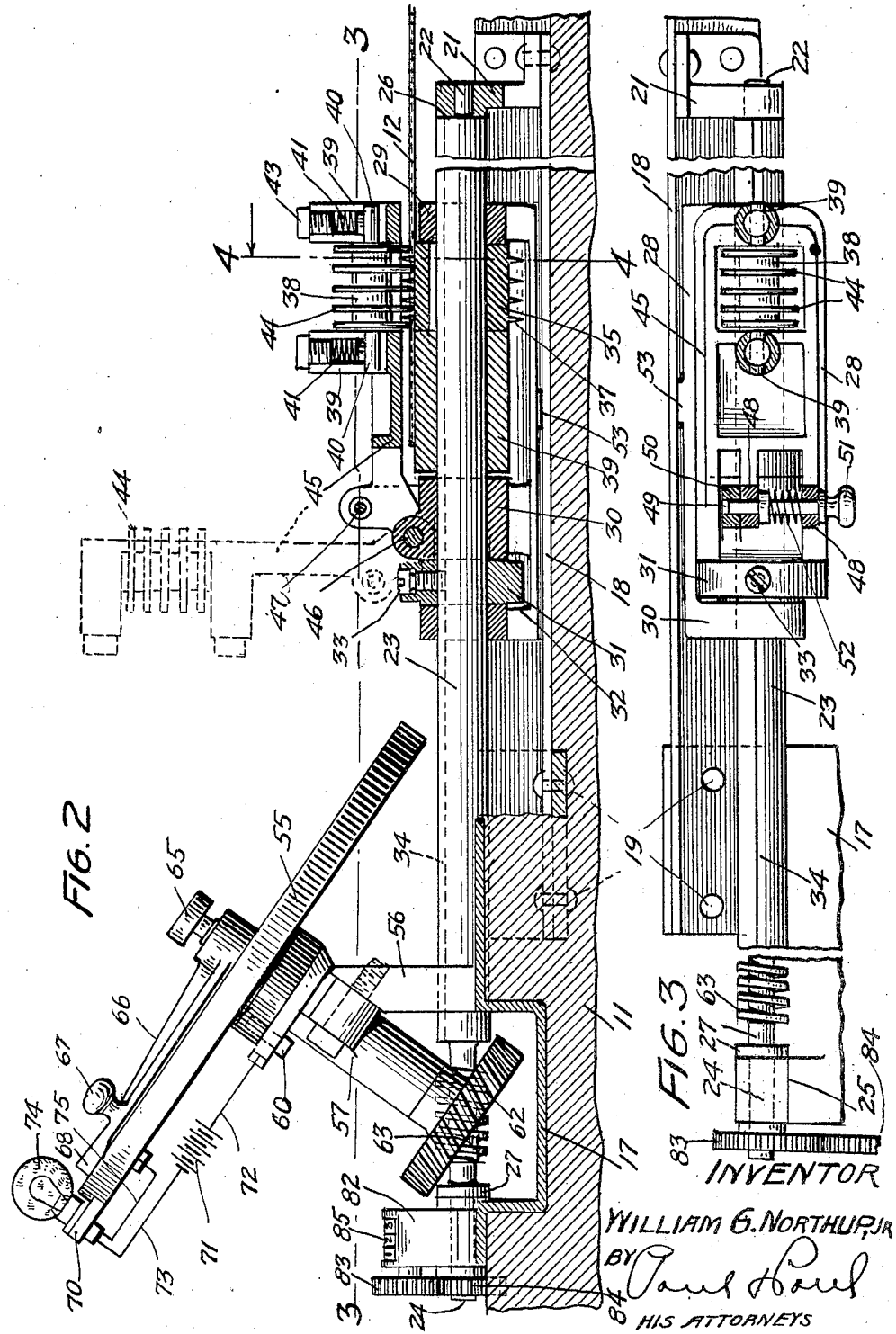

Nov. 27, 1923.                                              1,475,649
                    W. G. NORTHUP, JR
            CLOTH MEASURING AND REGISTERING DEVICE
                    Filed May 15, 1922            3 Sheets-Sheet 3
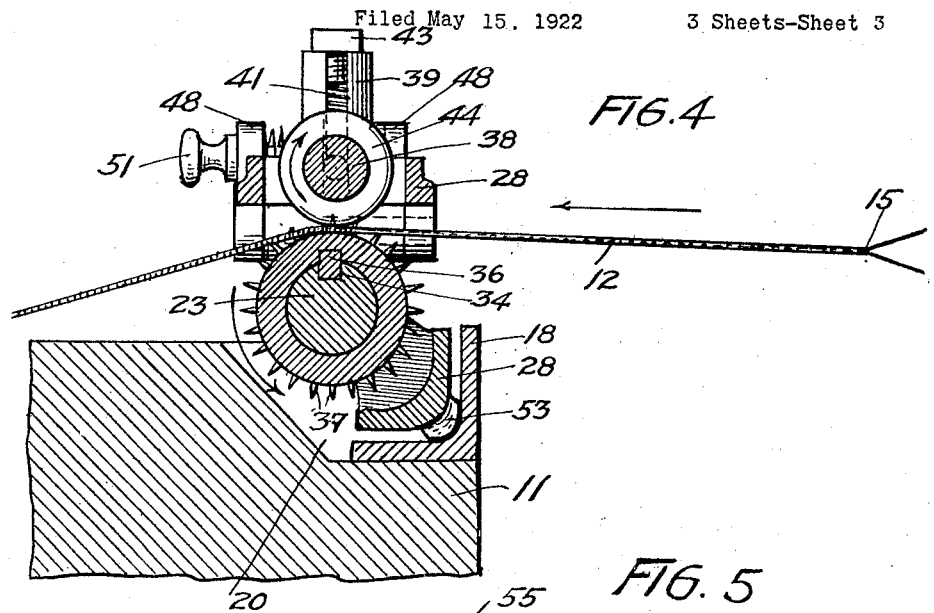
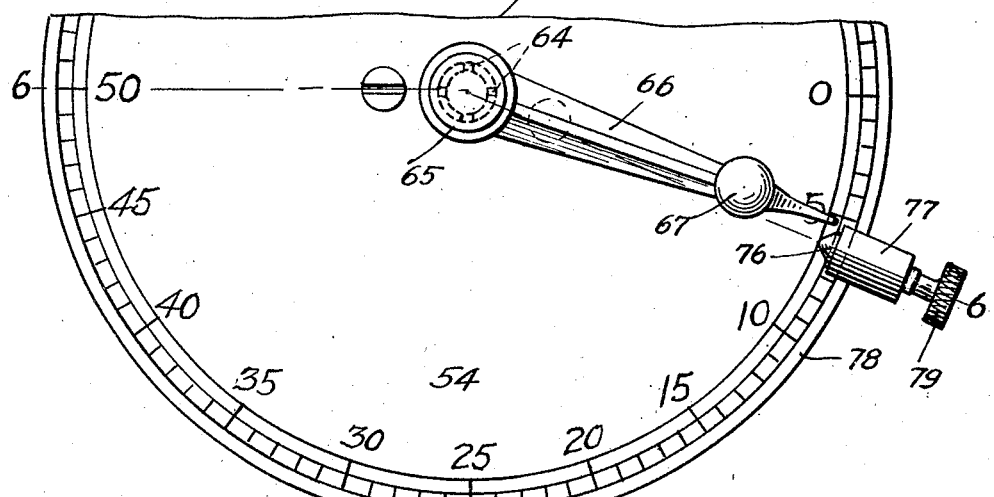
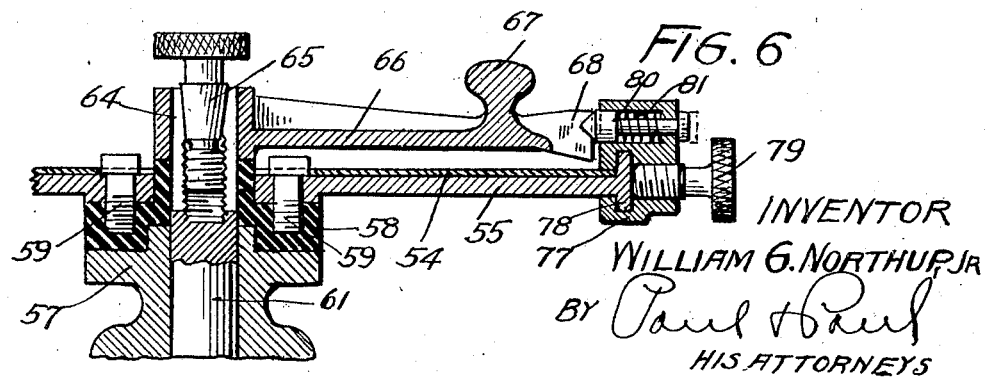
INVENTOR
WILLIAM G. NORTHUP JR
BY Paul H Paul
HIS ATTORNEYS Patented Nov. 27, 1923.

1,475,649

UNITED STATES PATENT OFFICE.

WILLIAM G. NORTHUP, JR., OF MINNEAPOLIS, MINNESOTA.

CLOTH MEASURING AND REGISTERING DEVICE.

Application filed May 15, 1922. Serial No. 561,077.

*To all whom it may concern:*

Be it known that I, WILLIAM G. NORTHUP, Jr., a citizen of the United States, resident of Minneapolis, county of Hennepin, State of Minnesota, have invented certain new and useful Improvements in Cloth Measuring and Registering Devices, of which the following is a specification.

The invention relates particularly to cloth measuring and registering devices for looms and an object is to provide means, attachable to looms, that will automatically and accurately measure the woven fabric as it passes from the weaving point in the loom and register the woven length, generally in units of inches, on a suitable dial at all times in full view of the operator.

Another object is to provide the device with signalling means at predetermined intervals at which time the loom must be stopped and adjusted for producing borders, embellishments, or other marks of different color or texture. In weaving cloth for blankets, it is especially important to have the marks or borders by which each blanket is subsequently cut to the predetermined unit length, woven in at exactly the predetermined distance apart to prevent inaccuracy in the length of the finished blankets and consequent waste of material.

As the unit length of the finished blankets or distance between borders or other marks must be predeterminably variable, the dial of my improved measuring device is provided with one or more adjustable contact points by which the signal, preferably of an electric type, is made to operate at any interval corresponding to the predetermined length of the units woven on the loom.

Another object of the invention is to provide permanent registering means whereby it may be ascertained at any time how many yards of cloth in totality has been woven.

The full objects and advantages of my invention will appear in the following detailed description, taken in connection with the accompanying drawings and the novel features of the invention will be particularly pointed out in the claims.

In the accompanying drawings forming part of this specification,

Figure 1 is a vertical section of the upper front part of a loom having my invention applied thereto, Figure 2 is a vertical sectional view generally taken on the line 2—2 of Figure 1, Figure 3 is a horizontal section on the line 3—3 of Figure 2, Figure 4 is a section on the line 4—4 of Figure 3, Figure 5 is a detail view of the registering dial illustrating the adjustable signal device, Figure 6 is a section on the line 6—6 of Figure 5.

Referring to Figure 1, 10 represents the frame of a loom having the usual breast beam 11, over which runs the woven fabric or cloth 12 to a sand roll 13 and idler roller 14 which feeds the cloth from the weaving point 15 of the loom to a suitable receiving roll, not shown in the drawings.

On top of the breast-beam 11, preferably on the left hand end thereof, I attach the frame plate 17 of the device on which the mechanism is carried. An angle bar 18 is rigidly attached to the frame plate 17 as by rivets 19, (see Figures 2 and 3) and projects inwardly preferably in a recess 20 formed in the breast-beam 11 to a point under the woven cloth some distance inward from the edge of the narrowest fabric woven on the loom. At the inner end of this angle bar is arranged a bearing lug 21 in which the reduced journal end 22 of a shaft 23 is carried. The opposite reduced end 24 of the shaft 23 is journaled in a bearing lug 25 arranged on the frame plate 17. Shoulders 26 and 27 on the shaft 23 bearing against the bearing lugs 21 and 25 prevent end movement of the shaft. A housing 28 is carried by the shaft 23 in bearings 29 and 30 and is adjustable longitudinally on the shaft by means of a collar 31 arranged in a slot 32 of the bearing 30 and securable to the shaft 23 by means of a set screw 33 preferably passing into the longitudinal groove or keyway 34 of the shaft. A measuring wheel 35 having a spline or key 36 projecting into the keyway 34 is mounted upon the shaft 23 between the bearings 29 and 30 and abuts the inner bearing 29 while a spacing collar 37 is preferably arranged between the measuring wheel and the outer bearing 30. The combined length of the wheel 35 and collar 37 is slightly less than the space between the bearings 29 and 30, thus permitting a slight longitudinal movement of the wheel 35. It is evident that the spacing collar 37 may, if preferred, be made integral with the wheel, the collar being for the purpose of providing room for the fabric 12 so that the measuring wheel will be spaced some distance from the outer edge of the fabric which is generally near the weaving point and put under extra tension in the loom that would interfere with the normal operation of the measuring wheel near the edge. The measuring wheel 35 is provided with a series of pointed short radial pins 36 projecting outwardly from its periphery and these pins are formed to readily pass into the fabric, traveling over the wheel as indicated in Figure 4 and thereby the wheel will be positively driven at the exact peripheral speed at which the fabric moves over the wheel, so that for every revolution of the wheel, a predetermined or known length of cloth or fabric has passed from the weaving point of the loom.

To positively insure the close adherence of the fabric to the wheel, I mount a pressure roller 38 in slotted bearings 39 above the wheel 35. The spindles 40 of the roller 38 are held in the slots of the bearings and downward pressure is applied to the spindles, preferably by means of compression springs 41, resting on washers 42 on top of the spindles and tensionably adjustable by means of screws 43. Annular flanges 44, spaced to rest on the periphery of the measuring wheel between the driving pins 36, are provided on the pressure roller 38 and these flanges hold the fabric close to the periphery of the measuring wheel. To start the fabric over the wheel it is necessary that the rollers 38 be removed from above the measuring wheel and for this purpose the bearings 39 are arranged in a tiltable plate 45 pivoted to the shaft bearing 30 on a pin 46 and locked in a lowered normal position, as shown in Figure 2, by means of a locking pin 47 passing through lugs 48 in the plate 45 and into a recess 49 in a stationary lug 50. The locking pin is provided with a hand knob 51 and may be withdrawn from the recess 49 against the tension of a spring 52, permitting the plate to be raised to the dotted line position in Figure 2 for the initial placing of the fabric on the measuring wheel 35 after which the pressure rollers are brought down to bear on the wheel 35 and locked in this position by the pin 47.

To guide the housing 28 and prevent its turning around with the shaft 23, the housing projects diagonally into the angle bar 18 and is preferably at one point provided with a projecting lug 53, slidably fitting the recess of the angle bar at the intersection of the angle members, as shown best in Figure 4. With this simple inexpensive construction, the housing is held against rotary movement while at the same time it is free to slide longitudinally for adjustment to the different widths of cloth that may be woven by the loom. The diameter of the measuring wheel 35 is preferably fixed so that at every revolution of the shaft 23 a definite number of inches, preferably four, will have passed over the wheel and these inches will be registered upon a dial 54 by means hereinafter set forth. The dial plate 55 is mounted on the frame plate 17 or in an inclined position facing the loom so that the dial is plainly visible to the operator from any point about the loom, as shown in Figures 1 and 2. The plate 55 is supported by means of posts 56 projecting upwardly from the frame plate 17 to which is attached a bearing bracket 57 having a spindle bearing central with and inclined at a right angle to the desired inclined angle of the dial plate. The dial plate 55 is attached to the bearing brackets 57 (see Figure 6) but preferably insulated therefrom by an interposed washer or collar 58 to which the dial plate is secured by screws 59 and which is secured to the bearing bracket by screws 60 (see Figure 1). In the bearing bracket 57 is journaled a spindle 61 carrying on its lower end a worm wheel 62 in mesh with a worm 63 formed in the shaft 23. The upper end of the shaft is cross slotted as indicated at 64 (Figures 5 and 6) and also internally threaded, the upper portion of the threaded opening being flared outwardly to receive a tapered thumb screw 65, that is adapted when screwed downwardly, to expand the upper split section of the spindle 61 projecting through the dial plate 55. A dial hand 66 has an opening fitting this split section and the tapered thumb screw 65 may be operated to expand the section and clamp the hand 66 to the spindle with any degree of firmness desired by the operator. A hand knob 67 and a contact blade 68 are preferably provided on the dial hand 66. A signalling device 69, preferably of an electric light type, as shown, although an electric bell or other similar signal may be substituted, is mounted on a bracket 70, preferably on the upper rim section of the dial plate. From a suitable source of electrical energy, such as a battery 71, a wire 72 is grounded in the bearing bracket 57 and a line wire 73 leads to the light bulb 74 from which the light wire 75 connects to the insulated dial plate 55. It is evident from this description that if the contact blade 68 of the dial hand 66 comes in contact with the dial plate, the circuit through the battery 71 is closed and the light bulb 74 will flash a light until the circuit is again broken. Upon the rim of the dial plate 55 I provide one or more adjustable contact points 76, preferably arranged in one or more T slotted contact brackets 77, the T slots of which slidably fit over the annular run 78 of the dial plate. A thumb screw 79 is threaded through the bracket by which means it may be clamped to the run at any desired point around the circumference of the dial plate. The contact point 76 preferably consists of a taper pointed bolt held inwardly against a shoulder 80 by a coiled spring 81 that permits the bolt to yield outwardly with the passing of the contact blade 68 of the dial hand.

As here shown, the dial is provided with numbers and marks from zero to 100, indicating inches, though this arrangement may vary according to requirements. When the weaving of a unit of fabric is to be commenced, the operator first pushes the dial hand to indicate or register zero, the hand usually being adjusted and clamped to the spindle 61 so that it may be forcibly turned thereon with sufficient friction to positively compel its movement with the spindle when left free. The contact points 76 having been adjusted to indicate the distance from the first end of the unit fabric to the beginning and ending of the borders or other marks to be woven into the fabric unit, the loom is started and as the weaving proceeds and the cloth passes over the measuring wheel, driving the wheel as previously described, the dial hand 66 slowly moves to the right over the dial, actuated through the shaft 23, worm 63, worm wheel 62 and spindle 61. As in the present instance, each revolution of the shaft 23 is equivalent to four inches of woven cloth and as the circle of the dial 54 is divided in one hundred inch marks, the speed ratio of the worm wheel 62 and worm 63 must be 1 to 25, whereby each single inch traveled by the cloth away from the weaving point will be registered on the dial by the travel of the dial hand from a one inch mark to the next.

When the dial hand has traveled over the required inch marks to the point where a border or other mark should be woven in the fabric or cloth unit, it engages a contact point 76 closing the signalling circuit when a light is flashed in the light bulb 74, warning the operator to stop and adjust the loom. The circuit is broken with the passing of the dial hand until another contact point is reached to indicate another stoppage and adjustment of the loom. It will be noted that the signalling device is not the most essential part of the invention, as the operator may, as an alternative, watch the dial hand during the comparatively slow progress of the weaving and note by the registered numbers and marks when the loom should be adjusted, but the signalling is valuable to prevent possible oversight or neglect on the part of the operator. When a unit of the predetermined length has been woven, for example, eighty inches, with the required borders or marks thereon, the dial hand or signal, or both, will register the fact and the dial hand is then swung around to the zero mark by the operator and another cloth unit commenced. It will be seen that the device is exceedingly simple of construction and positive of operation and that by the novel construction of the driving means for the measuring mechanism positive accuracy is attained by reason of the short fine pointed driving pins of the measuring wheel being forcefully driven into the cloth by the flanged roller; that the cloth will rest solidly upon the periphery of the measuring wheel, with no slippage possible; that by these means and the positive transmission of the movement of the measuring wheel to the registering dial the register will be accurate at all times, and that the reversal of travel of the cloth over the measuring wheel by the operator, which is frequently required when a thread breaks or for other reason, will not affect the correct registering of the length of the woven cloth.

It is desirable to provide means for checking up the work of the operator and preserve a record of the work done in a specified time, and for this purpose I attach to the frame plate 11 an accumulative counter or recording device 79, which may be of any known type and construction. A spur gear 80 is secured to the outer reduced end of the shaft 23 and meshes with the driving gear 81 of the counter 79. The ratio of the gears 80 and 81 are fixed, if preferred, so that the indicating or registering wheels 82 will indicate the length of cloth in yards that has passed over the measuring wheel or the counter may be made to register both yards and inches.

Various details of the device may evidently be modified without departing from the scope of the invention, and I do not, therefore, limit myself strictly to the detailed construction as shown and described.

I claim as my invention:

1. A cloth measuring and registering device adapted for attachment to a loom, comprising a wheel having teeth adapted to penetrate a web of cloth traveling through the loom, means for pressing the cloth down upon the surface of the wheel and holding it in engagement with said teeth, and a measuring indicator connected with said wheel.

2. A cloth measuring and registering device adapted for attachment to a loom, comprising a wheel having teeth adapted to penetrate a web of cloth traveling through the loom, means for pressing the cloth down upon the surface of the wheel and holding it in engagement with said teeth, a measuring indicator connected with said wheel, and means in connection with said indicator for calling the attendant's attention to the passage of a certain length of cloth web through the loom.

3. A device of the class described adapted for attachment to a loom, comprising a wheel having teeth adapted for penetrating a web of cloth passing through the loom and actuated by the travel of the cloth, a tilting frame, pressure wheels mounted thereon and adapted to pass between the teeth of said first named wheel and hold the cloth web in engagement therewith, the tilting of said frame allowing the cloth web to be initially engaged with said teeth, and an indicating device connected with and actuated by the movement of said wheel.

4. A device of the class described adapted for attachment to a loom, comprising a shaft, a wheel on said shaft having teeth adapted to engage a web of cloth, means for holding the cloth in engagement with said teeth, a dial having means for indicating when a certain length of cloth web has passed from said wheel, and a driving mechanism for said dial between it and said wheel.

5. A device of the class described, comprising a wheel having peripheral teeth adapted for engagement with a web of cloth traveling through the loom, means for holding the cloth in engagement with said teeth, a shaft whereon said wheel is mounted, said shaft having a worm thereon, a worm wheel meshing with said worm, a dial shaft whereon said worm wheel is mounted, an indicator hand on said dial shaft, and a dial marked to indicate certain lengths of cloth over which said hand is movable through the revolution of said worm and worm wheel.

6. A device of the class described adapted for attachment to a loom, comprising a wheel having teeth adapted to penetrate a web of cloth traveling through the loom, and a measuring indicator connected with said member.

7. A device of the class described adapted for attachment to a loom, comprising a wheel having teeth adapted for penetrating the web of cloth passing through the loom and actuated by the travel of the cloth, a shaft on which said wheel is mounted, a tilting frame, pressure wheels mounted thereon and adapted to pass between the teeth of said cloth-engaging wheel for holding the cloth web in engagement therewith, the tilting of said frame allowing the cloth web to be initially engaged by said teeth, an indicator hand on said shaft, and a dial marked to indicate certain lengths of cloth and operated from said wheel and said shaft.

In witness whereof, I have hereunto set my hand this 11th day of May, 1922.

WILLIAM G. NORTHUP, Jr.